(12) United States Patent
Wilkinson et al.

(10) Patent No.: US 9,577,825 B2
(45) Date of Patent: Feb. 21, 2017

(54) QUANTUM KEY DISTRIBUTION VIA PULSE POSITION MODULATION

(71) Applicant: Raytheon Company, Waltham, MA (US)

(72) Inventors: Steven R. Wilkinson, Stevenson Ranch, CA (US); Ulvi Yurtsever, Altadena, CA (US)

(73) Assignee: Raytheon Company, Waltham, MA (US)

( * ) Notice: Subject to any disclaimer, the term of this patent is extended or adjusted under 35 U.S.C. 154(b) by 60 days.

(21) Appl. No.: 14/337,688

(22) Filed: Jul. 22, 2014

(65) Prior Publication Data
US 2016/0028541 A1    Jan. 28, 2016

(51) Int. Cl.
*H04L 9/08*    (2006.01)

(52) U.S. Cl.
CPC ........... *H04L 9/0858* (2013.01); *H04L 9/0852* (2013.01); *H04L 9/0855* (2013.01); *H04L 2209/24* (2013.01); *H04L 2209/34* (2013.01)

(58) Field of Classification Search
USPC ................ 380/256, 255, 263, 270, 277, 278
See application file for complete search history.

(56) References Cited

U.S. PATENT DOCUMENTS

| | | | | |
|---|---|---|---|---|
| 5,850,441 A | * | 12/1998 | Townsend | H04L 9/0852 380/256 |
| 2007/0071245 A1 | * | 3/2007 | Kuang | H04L 9/0855 380/278 |
| 2007/0076884 A1 | * | 4/2007 | Wellbrock | H04L 9/0858 380/263 |
| 2012/0154062 A1 | * | 6/2012 | Wilkinson | G04F 5/14 331/94.1 |

FOREIGN PATENT DOCUMENTS

| TW | 201618491 A | 5/2016 |
|---|---|---|
| WO | WO-2016014475 A1 | 1/2016 |

OTHER PUBLICATIONS

Kumar et al., Quantum key distribution using transverse spin wave-optical interactions, 2011, Advances in photonics of Quantum Computing, Memory, and Communication IV, vol. 7948.*
"International Application Serial No. PCT/US2015/041263, International Search Report mailed Oct. 2, 2015", 4 pgs.

(Continued)

*Primary Examiner* — Jeffrey Pwu
*Assistant Examiner* — Samuel Ambaye
(74) *Attorney, Agent, or Firm* — Schwegman Lundberg & Woessner, P.A.

(57) ABSTRACT

A system and method for distributing a quantum key from a first party to a second party. A first node is connected to a public channel, wherein the first node includes a pulse position modulation encoder connected to a quantum channel. A second node is connected to the public channel, wherein the second node includes a pulse position modulation decoder connected to the quantum channel. The pulse position modulation encoder encodes quantum states $|0\rangle$ and $|1\rangle$, and transmits the encoded quantum states from the first node to the second node via the quantum channel. Quantum state $|1\rangle$ is encoded as $|1\rangle=(|t_1\rangle+|t_2\rangle)/\sqrt{2}$.

12 Claims, 4 Drawing Sheets

(56) References Cited

OTHER PUBLICATIONS

"International Application Serial No. PCT/US2015/041263, Written Opinion mailed Oct. 2, 2015", 9 pgs.

Alleaume, Romain, et al., "SECOQC White Paper on Quantum Key Distribution and Cryptography", Arxiv.org, cornell university library, 201 olin library cornell university ithaca, NY 14853, XP080269269, (Jan. 22, 2007), 1-26.

Dehmani, Mustapha, et al., "Quantum key distribution with several intercepts and resend attacks with partially non-orthogonal basis states", OPTIK, vol. 125, No. 2,XP028766062, ISSN: 0030-4026, DOI: 10.1016/J.IJLEO, (Feb. 10, 2013).

Kumar, Pradeep, et al., "Quantum key distribution using transverse spin wave-optical interactions", Proc. SPIE 7948, (2011), D1-D6.

Lomonaco, Samuel, et al., "A Quick Glance at Quantum Cryptography", Arxiv.org, cornell university library, 201 olin library cornell university ithaca, NY 14853, XP080646604, (Nov. 8, 1998).

Nicolas, Gisin, "Quantum Cryptography", Arxiv.org, cornell university library, 201 olin library cornell university ithaca, NY 14853, XP080040705, DOI: 10-1103/REVM0DPHYS, (2001), 1-57.

Nazarathy, M., "Quantum key distribution over a fiber-optic channel by means of pulse position modulation", Optics Letters, 30(12), (2005), 1533-1535.

\* cited by examiner

QUANTUM KEY DISTRIBUTION VIA PULSE POSITION MODULATION

BACKGROUND

There have been recent proposals for implementing the quantum cryptographic protocol BB92 with quantum states based on pulse-position modulation instead of polarization. Attempts to do so to date have been flawed; they are vulnerable to eavesdropping attacks since they do not fully implement the BB92 protocol. Some such approaches are detailed in Nazarathy, "*Quantum key distribution over a fiber-optic channel by means of pulse position modulation*," Optics Letters 1533, 30 (2005).

What is needed is a quantum cryptographic protocol BB92 with quantum states based on pulse-position modulation which addresses these issues, and other issues that become apparent in the discussion below.

BRIEF DESCRIPTION OF THE DRAWINGS

Embodiments are illustrated by way of example, and not by way of limitation, in figures of the accompanying drawings in which like reference numerals refer to similar elements.

BRIEF DESCRIPTION OF THE DRAWINGS

In the following detailed description of example embodiments of the invention, reference is made to specific examples by way of drawings and illustrations. These examples are described in sufficient detail to enable those skilled in the art to practice the invention, and serve to illustrate how the invention may be applied to various purposes or embodiments. Other embodiments of the invention exist and are within the scope of the invention, and logical, mechanical, electrical, and other changes may be made without departing from the subject or scope of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims.

Figure 1:
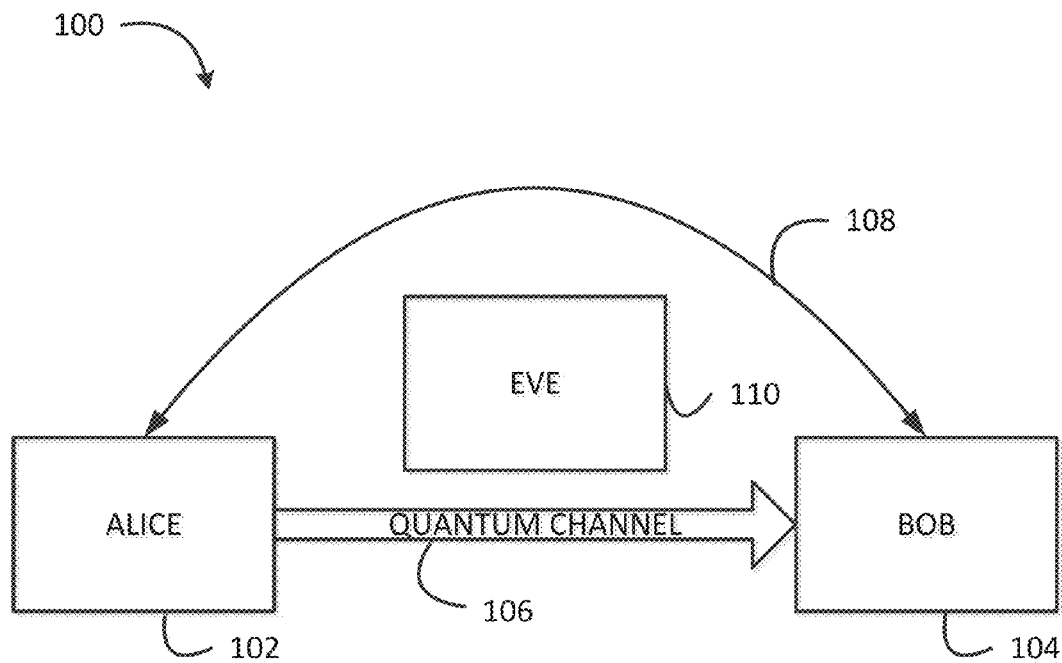
FIG. 1 illustrates a quantum key distribution system according to one aspect of the present invention.

A system 100 for Quantum Key Distribution (QKD) via pulse position modulation is shown in FIG. 1. In the example embodiment shown in FIG. 1, quantum key distribution allows two parties, Alice 102 and Bob 104, to share a common secret key via a quantum channel 106. The shared secret key is then used to encrypt data transferred between Alice and Bob via public channel 108.

Quantum Key Distribution, when done properly, guarantees the secrecy of the distributed key. If an eavesdropper (Eve 110) tries to determine the key, she will introduce transmission errors in the distribution of the key and will be detected; the shared secret key can then be discarded before it is used to transmit compromised data. If, on the other hand, no eavesdropping is detected, the secrecy of the distributed key is guaranteed.

Figure 2:
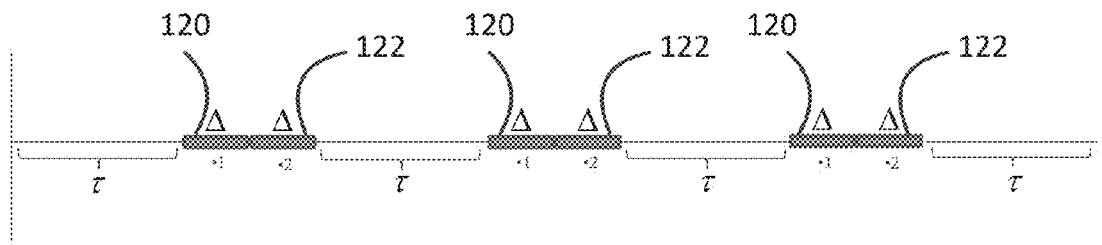
FIG. 2 illustrates pulse position modulation encoding.

Pulse position modulation coding of bits 0 and 1 is illustrated in FIG. 2. In the example embodiment of FIG. 2, the position of the pulse in an active time window of length $2\Delta$ determines the bit: position in time bin 2 (bin 122 in FIG. 2) corresponds to the bit 0, and position in time bin 1 (bin 120 in FIG. 2) corresponds to the bit 1. Active windows are separated by a fixed latency time interval $\tau$.

Figure 3:
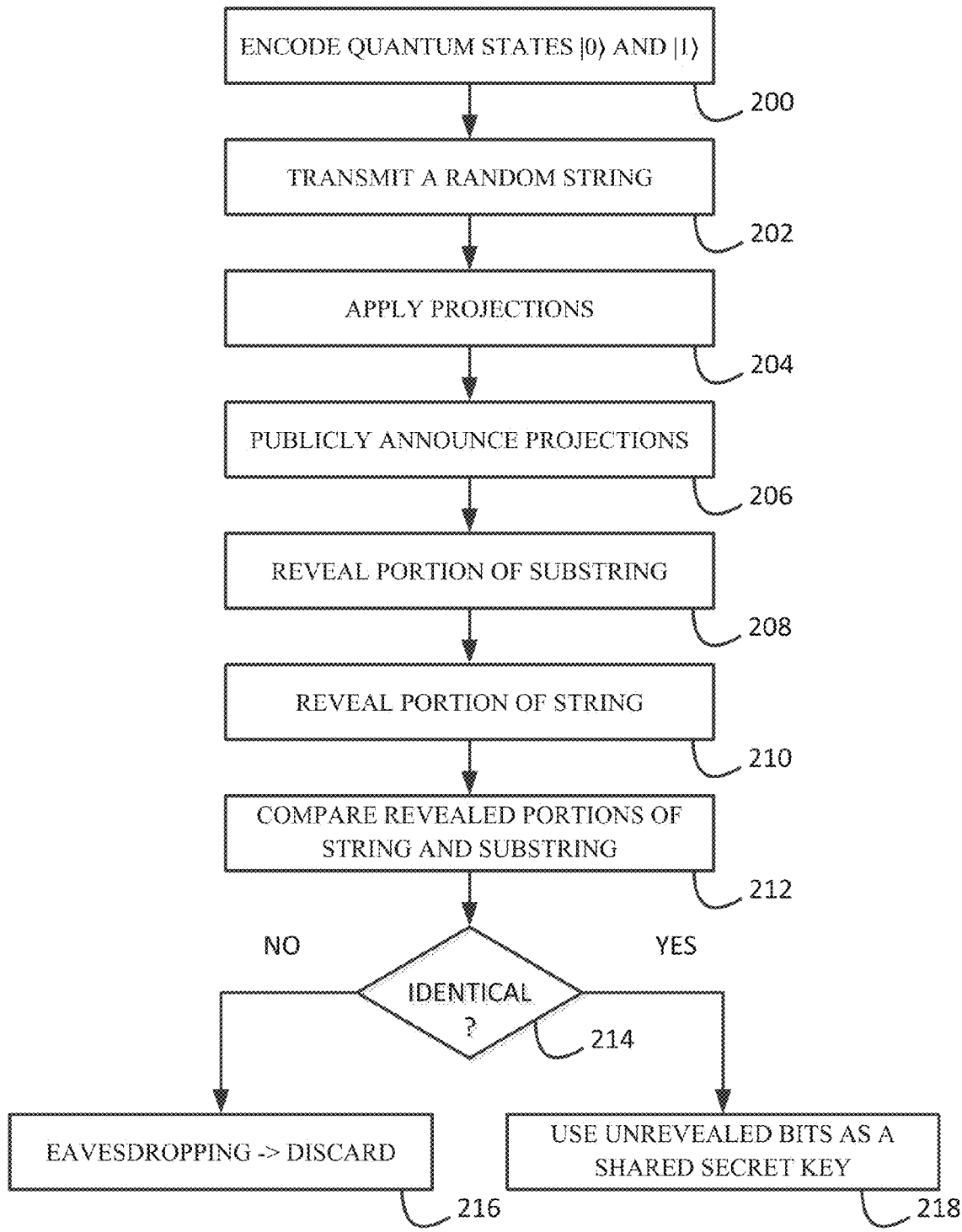
FIG. 3 illustrates a method of distributing a quantum key from a first party to a second party.

As shown in FIG. 3, the BB92 protocol according to the present invention is the following: Alice encodes quantum states $|0\rangle$ and $|1\rangle$ at 200 and sends them to Bob at 202. Quantum states $|0\rangle$ and $|1\rangle$ are not orthogonal: $\langle 1|0\rangle \neq 0$. Quantum state $|0\rangle$ is how a zero is encoded as a quantum state (as detailed below). Quantum state $|1\rangle$ is how a one is encoded as a quantum state (as detailed below). Initially, Alice sends Bob a random string of $|0\rangle$'s and $|1\rangle$'s. At 204, Bob measures the states he receives by randomly applying the projections on $|0\rangle^\perp$ and $|1\rangle^\perp$:

$$P_{|0\rangle^\perp} = 1 - |0\rangle\langle 0|$$

$$P_{|1\rangle^\perp} = 1 - |1\rangle\langle 1|$$

Bob publicly announces, at 206, the indices of those measurements (projections) in which he got a positive result (=1). Alice privately constructs the substring which consists of the bits she sent Bob with the same indices as those Bob just publicly announced. Alice reveals a portion of the substring at 208.

Bob privately constructs the string $$S_i \equiv \begin{cases} 1 \text{ if the projection Bob used to obtain the positive result was } P_{|0\rangle^\perp} \\ 0 \text{ if the projection Bob used to obtain the positive result was } P_{|1\rangle^\perp} \end{cases}$$

for each index i he announced. Alice's substring and the string Bob constructs must be identical in the absence of noise and or eavesdropping. Public discussion follows as in the standard BB84 protocol. That is, a portionn of the raw common bits are publicly revealed at 208 and 210 and a check is made at 214 to make sure they are identical. If they are not, eavesdropping is concluded at 216 and the whole procedure is discarded. If they are, then the remaining unrevealed bits are used as the shared secret key at 218.

Figure 4:
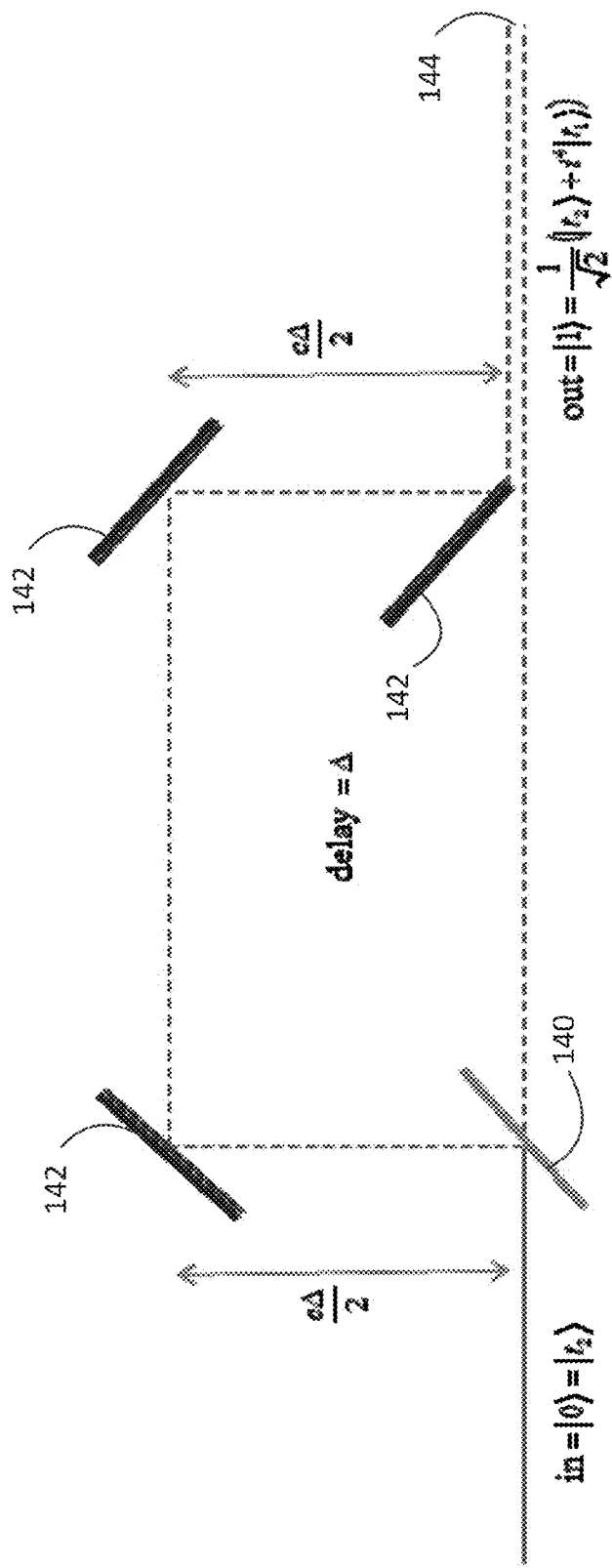
FIG. 4 illustrates quantum key encoding.

In the new PPM protocol, the state $|0\rangle$ is encoded as the state "pulse is in second bin" represented by $|0\rangle$, $|t_2\rangle$, and the state $|1\rangle$ is encoded as the state "pulse is in coherent superposition of the first and second bins," represented by $|1\rangle \equiv (|t_1\rangle + |t_2\rangle)/\sqrt{2}$. An example pulse position modulation encoder is shown in FIG. 4. In some embodiments, the new protocol relies on precise clock synchronization between Alice and Bob as part of the implementation of two key requirements.

The first key requirement is the efficient construction of the states:

$$|0\rangle \equiv |t_2\rangle \text{ and } |1\rangle \equiv (|t_1\rangle + |t_2\rangle)/\sqrt{2},$$

The construction of the state $|0\rangle$ is the same as the classical PPM state. The construction of the superposition state $|1\rangle$, however, is more complex because, as noted above, $|1\rangle \equiv (|t_1\rangle + |t_2\rangle)/\sqrt{2}$. A pulse position modulation encoder for encoding $|1\rangle \equiv (|t_1\rangle + |t_2\rangle)/\sqrt{2}$ is shown in FIG. 4. In the example shown in FIG. 4, simple optical elements are used to transmit the non-classical coherent superposition state $(|t_2\rangle+|t_1\rangle)/\sqrt{2}$. Schematically, as shown in FIG. 4, these simple optical elements include an initial beam splitter 140 and mirrors 142 (to delay half the beam by $\Delta$). In one such embodiment, the split beams are combined into output channel 144 at the end.

The second key requirement is the construction of the projection operators $P_{|0\rangle^\perp} \equiv 1 - |0\rangle\langle 0|$ and $P_{|1\rangle^\perp} \equiv 1 - |1\rangle\langle 1|$. Observe that the measurement $P_{|0\rangle^\perp}$ must be guaranteed to not click when the input state is $|0\rangle$, and click with probability $1-|\langle 1|0\rangle|^2$ when the input state is $|1\rangle$. Conversely, the measurement $P_{|1\rangle^\perp}$ must be guaranteed to not click when the input state is $|1\rangle$, and click with probability $1-|\langle 1|0\rangle|^2$ when the input state is $|0\rangle$. One example implementation of these measurement operators is illustrated in the pulse position modulation decoder of FIG. 5.

Figure 5:
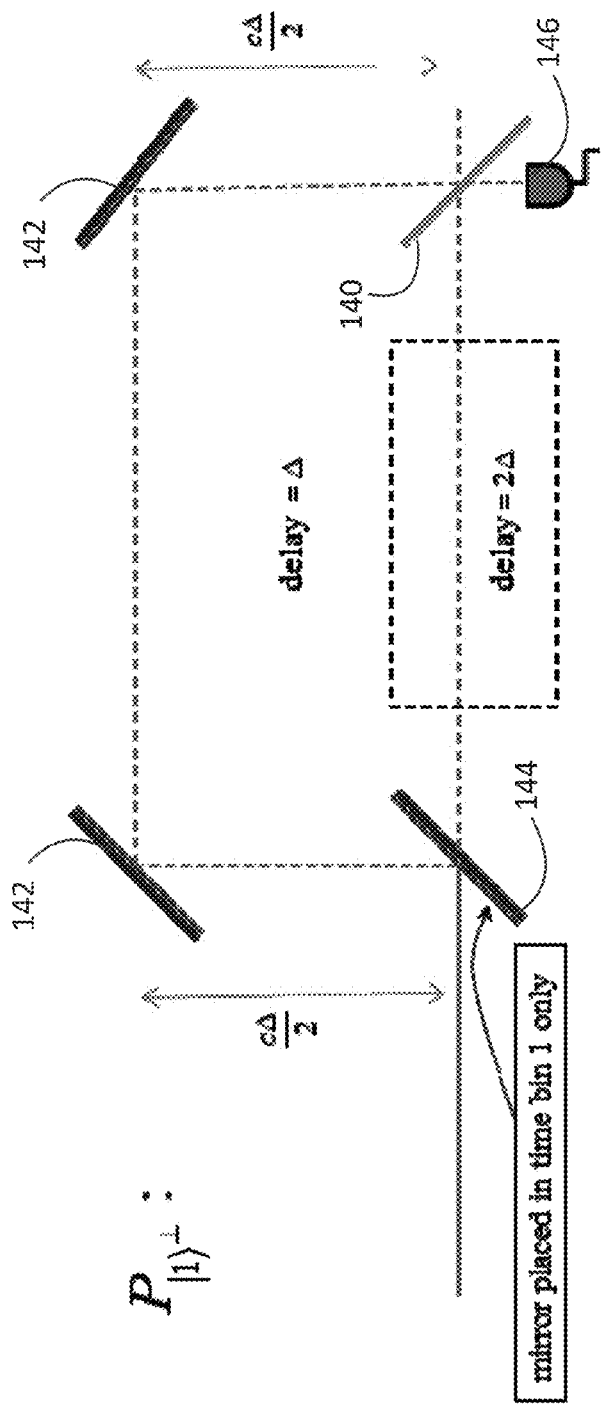
FIG. 5 illustrates quantum key decoding.

In the example embodiment shown in FIG. 5, a mirror 144 receives quantum states sent by Alice 102 and, in time bin 1 reflects the quantum states while in time bin 2, letting the signal through. Mirrors 142 reflect the reflected quantum states and the delayed reflected quantum states are combined with a delayed bin 2 set of quantum states by beam splitter 140 before being detected by detector 146. In one embodiment, detector 146 only detects photons that have are moving down to it.

In one example embodiment, the measurement $P_{|0\rangle^\perp}$ must be guaranteed to not click with input state $|0\rangle$, and click with probability ½ with input state $|1\rangle$. As shown in FIG. 5, implementing $P_{|0\rangle^\perp}$ is easy: Just do a detection in time bin 1.

Likewise, the measurement $P_{|1\rangle^\perp}$ must be guaranteed to not click with input state $|1\rangle$, and click with probability ½ with input state $|0\rangle$. Implementing $P_{|1\rangle^\perp}$ is hard. In one embodiment, it requires precise timekeeping and synchronization in the placement of the initial mirror (in time bin 1 only), and in controlling the phase and time delays to make sure the detector never goes off with input state $|1\rangle$.

As noted above, precise clock synchronization is required between Alice 102 and Bob 104. In one example embodiment, this is achieved, at least in part, via an ultra-stable frequency reference such as described in U.S. patent application Ser. No. 13/400,348, filed by Wilkerson et al. on Feb. 20, 2012 the description of which is incorporated herein by reference. Synchronization of distant ultra-stable clocks can be achieved via a number of methods such as the Einstein synchronization protocol using optical two-way time transfer, with either optical fiber or free-space propagation.

In some embodiments, the ultra-stable frequency reference generating system described in U.S. patent application Ser. No. 13/400,348 includes a cavity-stabilized reference laser that includes a laser source locked to a stabilized cavity. In some such embodiments, the system also includes a Rubidium (Rb) cell that may be interrogated by a stabilized laser output of the cavity-stabilized reference laser to cause at least a two-photon Rubidium transition (to an upper state) within the Rubidium cell. A detector detects fluorescence within the Rubidium cell resulting from the spontaneous decay of the upper state Rubidium transition. Other vapor cell references can be used as well.

In vapor cell embodiments, the detector provides a detector output at a wavelength of the fluorescence to lock the cavity-stabilized reference laser to generate a stabilized laser output. In some such embodiments, the laser source is locking to both the stabilized cavity and to the Rubidium transition within the Rubidium cell. The combination of a cavity stabilized laser and femtosecond frequency comb referenced to the 778 nm two-photon transition in Rubidium as a source of ultra-low phase noise optical and microwave frequencies can be used, for instance, as standards in a compact system configuration.

As noted in the patent application, such systems are useful in systems that require synchronization; they are also suitable for use in, for instance, radar systems, communication systems, signal-collection systems and difficult EMI environments.

The description and the drawings herein sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

What have been described above are new systems and methods for quantum key distribution. The systems and methods described fully implement the BB92 protocol and which thus have the same absolute unconditional security properties as the standard polarization-based QKD protocol BB84. In one embodiment, a new method of encoding a $|1\rangle$ simplifies construction of a quantum key encoder.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the system may include one or more processors and may be configured with instructions stored on a computer-readable storage device.

What is claimed is:

1. A system, comprising:
    a quantum channel;
    a public channel;
    a first node connected to the public channel, wherein the first node includes a pulse position modulation encoder connected to the quantum channel; and
    a second node connected to the public channel, wherein the second node includes a pulse position modulation decoder connected to the quantum channel, wherein the pulse position modulation encoder is configured to:
        encode a quantum state $|0\rangle$ by producing a first light pulse that occurs in a first time bin and transmitting the first light pulse;
        encode a quantum state $|1\rangle$ by producing a first light pulse that occurs in the first time bin, producing a second light pulse that occurs in a second time bin, and transmitting the first and second light pulses together as a pseudo-light pulse having a precise time separation defined by a temporal separation of the first and second time bins; and
        transmit the encoded quantum states $|0\rangle$ and $|1\rangle$ via the quantum channel to the second node;
    wherein the pulse position modulation encoder includes a beam splitter and three mirrors, wherein the three mirrors are positioned to delay the beam from the beam splitter by the temporal separation of the first and second time bins.

2. The system of claim 1, wherein the first and second nodes are synchronized via separate reference signals formed by interrogating Rubidium (Rb) cells with stabilized laser outputs of cavity-stabilized reference lasers.

3. The system of claim 1, wherein the pulse position modulation decoder includes a beam splitter and three mirrors, wherein one of the three mirrors only reflects light during the first time bin.

4. The system of claim 1, wherein the second node determines a shared secret key from the quantum states |0> and |1> received from the first node and uses the shared secret key to encrypt data transferred on the public channel.

5. The system of claim 4, wherein the second node detects eavesdropping as a function of the quantum states |0> and |1> received from the first node.

6. A pulse position modulation encoder configured to:
encode a quantum state |0> by producing a first light pulse that occurs in a first time bin and transmitting the first light pulse:
encode a quantum state |1> by producing the first light pulse that occurs in the first time bin, producing a second light pulse that occurs in a second time bin, and transmitting the first and second light pulses together as a pseudo-light pulse having a precise time separation defined by a temporal separation of the first and second time bins; and
transmit the encoded quantum states |0> and |1> out through a quantum channel interface;
wherein the pulse position modulation encoder includes a beam splitter and three mirrors, wherein the three mirrors are positioned to delay the beam from the beam splitter by the temporal separation of the first and second time bins.

7. The encoder of claim 6, wherein the pulse position modulation encoder is synchronized to a pulse position modulation decoder via separate reference signals formed by interrogating Rubidium (Rb) cells with stabilized laser outputs of cavity-stabilized reference lasers.

8. A pulse position modulation decoder configured to:
decode quantum states |0> and |1> received through a quantum channel interface;
decode the quantum state |0> by receiving a first light pulse that occurs in a first time bin; and
decode the quantum state |1> by receiving a first light pulse that occurs in a second time bin, the first and second light pulses together forming a pseudo-light pulse having a precise time separation defined by a temporal separation of the first and second time bins;
wherein the pulse position modulation decoder includes a beam splitter and three mirrors, wherein one of the three mirrors only reflects light during the first time bin.

9. The decoder of claim 8, wherein the pulse position modulation decoder is synchronized to a pulse position modulation encoder via separate reference signals formed by interrogating Rubidium (Rb) cells with stabilized laser outputs of cavity-stabilized reference lasers.

10. A method of distributing; a quantum key from first party to a second party, the method comprising:
encoding a quantum state |0> by producing a first light pulse that occurs in a first time bin and transmitting the first light pulse;
encoding a quantum state |1> by producing the first light pulse that occurs in the first bin, producing a second light pulse that occurs in a second time bin, and transmitting the first and second light pulses together as a pseudo-light pulse having a precise time separation defined by a temporal separation of the first and second time bins;
transmitting a random string of quantum states |0> and |1> from the first party to the second party;
measuring the quantum states by the second party, wherein measuring includes applying projections on the random string of quantum states |0> and |1>;
publicly announcing the projections;
privately constructing, by the first party, a substring, wherein the substring includes bits sent in he random string of quantum states with indices that match indices in the projections;
privately constructing, by the second party, a string, wherein the string is a function of the projections;
publicly revealing a portion of the substring;
publicly revealing a portion of the string;
comparing the revealed portion of the substring to the revealed portion of the string;
if the revealed portion of the substring is identical to the revealed portion of the string, using remaining unrevealed bits of the string and substring as a shared secret key; and
if the revealed portion of the substring is not identical to the revealed portion of the string, noting eavesdropping.

11. The method of claim 10, wherein the first and second parties synchronize via separate reference signals formed by interrogating Rubidium (Rb) cells with stabilized laser outputs of cavity-stabilized reference lasers.

12. An article comprising a nontransitory computer-readable medium having instructions thereon, wherein the instructions, when executed in a computer, create a system for executing a method of distributing a quantum key from a first party to a second party, the method comprising:
encoding a quantum state |0> by producing a first light pulse that occurs in a first time bin and transmitting the first light pulse;
encoding a quantum state |1> by producing the first light pulse that occurs in the first time bin, producing a second light pulse that occurs in a second time bin, and transmitting the first and second light pulses together as a pseudo-light pulse having a precise time separation defined by a temporal separation of the first and second time bins;
transmitting a random string of quantum states |0> and |1> from the first party to the second party;
measuring the quantum states by the second party, wherein measuring includes applying projections on the random string of quantum states |0> and |1>;
publicly announcing the projections;
privately constructing, by the first party, a substring, wherein the substring includes bits sent in the random string of quantum states with indices that match indices in the projections;
privately constructing, by the second party, a string, wherein the string is a function of the projections;
publicly revealing a portion of the substring;
publicly revealing a portion of the string;
comparing the revealed portion of the substring to the revealed portion of the string;
if the revealed portion of the substring is identical to the revealed portion of the string, using remaining unrevealed bits of the string and substring as a shared secret key; and
if the revealed portion of the substring is not identical to the revealed portion of the string, noting eavesdropping.

* * * * *

UNITED STATES PATENT AND TRADEMARK OFFICE
CERTIFICATE OF CORRECTION

PATENT NO. : 9,577,825 B2  
APPLICATION NO. : 14/337688  
DATED : February 21, 2017  
INVENTOR(S) : Wilkinson et al.

Page 1 of 2

It is certified that error appears in the above-identified patent and that said Letters Patent is hereby corrected as shown below:

In the Specification

In Column 1, Line 23, after "in", insert --the--

In Column 1, Line 33-35, delete "BRIEF DESCRIPTION OF THE DRAWINGS" and insert --DETAILED DESCRIPTION-- therefor In Column 2, Line 49, delete "|0>, |t₂>," and insert --$|0\rangle \equiv |t_2\rangle$,-- therefor In Column 2, Line 65, delete "$|1\rangle = (|_1\rangle + |t_2\rangle)/\sqrt{2}$" and insert --$|1\rangle \equiv (|t_1\rangle + |t_2\rangle)/\sqrt{2}$-- therefor In Column 3, Line 10, delete "|1)." and insert --|1>.-- therefor In Column 3, Line 12, delete "1-|<1|0>²" and insert --1-|<1|0>²|-- therefor In the Claims In Column 4, Line 49, in Claim 1, delete "10>" and insert --|0>-- therefor In Column 4, Line 52, in Claim 1, before "first", delete "a" and insert --the-- therefor In Column 5, Line 17, in Claim 6, delete "pulse:" and insert --pulse;-- therefor In Column 5, Line 38, in Claim 8, delete "10>" and insert --|0>-- therefor In Column 5, Line 40, in Claim 8, delete "10>" and insert --|0>-- therefor Signed and Sealed this  
Twenty-fourth Day of July, 2018

Andrei Iancu  
*Director of the United States Patent and Trademark Office*

CERTIFICATE OF CORRECTION (continued)
U.S. Pat. No. 9,577,825 B2

In Column 5, Line 43, in Claim 8, after "in", insert --the first time bin and a second light pulse that occurs in--

In Column 5, Line 55, in Claim 10, delete "distributing;" and insert --distributing-- therefor In Column 5, Line 55, in Claim 10, after "from", insert --a--

In Column 5, Line 61, in Claim 10, after "first", insert --time--

In Column 6, Line 8, in Claim 10, delete "he" and insert --the-- therefor